US010724503B2

United States Patent
(12) United States Patent
Al-Qanaei

(10) Patent No.: US 10,724,503 B2
(45) Date of Patent: Jul. 28, 2020

(54) ROTATING SUPPORT FOR MULTIPLE WIND TURBINES

(71) Applicant: Ahmad Abdallah Al-Jassem Al-Qanaei, Salwa (KW)

(72) Inventor: Ahmad Abdallah Al-Jassem Al-Qanaei, Salwa (KW)

( * ) Notice: Subject to any disclaimer, the term of this patent is extended or adjusted under 35 U.S.C. 154(b) by 17 days.

(21) Appl. No.: 15/822,158

(22) Filed: Nov. 26, 2017

(65) Prior Publication Data

US 2019/0162169 A1 May 30, 2019

(51) Int. Cl.
*F03D 13/20* (2016.01)
*F03D 7/02* (2006.01)
*F03D 1/02* (2006.01)
*F03D 9/00* (2016.01)

(52) U.S. Cl.
CPC ............... *F03D 13/20* (2016.05); *F03D 1/02* (2013.01); *F03D 7/026* (2013.01); *F03D 9/007* (2013.01); *F05B 2270/30* (2013.01)

(58) Field of Classification Search
CPC .......... F03D 13/20; F03D 15/00; F03D 15/10; F03D 9/007; F03D 9/11; F03D 1/02; F03D 3/005; F03D 3/02; F03D 7/026; F03D 7/042; F03D 7/06; F05B 2270/30; F05B 2260/40311; F05B 2260/85; F05B 2270/337; Y02E 10/40; Y02E 10/722; Y02E 10/723; Y02E 10/76; Y02E 10/763; Y02E 10/766
USPC .......................................................... 415/916
See application file for complete search history.

(56) References Cited

U.S. PATENT DOCUMENTS 6,641,367 B1 * 11/2003 Van der Klippe ........ F03D 1/02 416/99
6,749,399 B2 * 6/2004 Heronemus ............... F03D 1/02 416/41
7,090,465 B2 * 8/2006 Flamang ............... F16H 1/2836 416/170 R
8,378,516 B2 2/2013 Lee
8,734,288 B2 5/2014 Poon
9,194,374 B2 * 11/2015 Valero Lafuente ..... F03D 80/00
9,562,518 B2 * 2/2017 Patel .......................... F03D 7/06
2018/0180022 A1 * 6/2018 Baun ..................... F03D 7/0264
2019/0048847 A1 * 2/2019 Andersen .................. F03D 1/02

FOREIGN PATENT DOCUMENTS

WO WO-2010098813 A1 * 9/2010 ............... F03D 1/02

* cited by examiner

*Primary Examiner* — Igor Kershteyn
*Assistant Examiner* — Andrew Thanh Bui
(74) *Attorney, Agent, or Firm* — Richard C. Litman; Nath, Goldberg & Meyer

(57) ABSTRACT

A system for generating its own air currents to run electric turbines. The system includes: a vertical tower or support provided with a rotating disk at its upper end, up to four laterally extending arms connected to the disk, each arm carrying a wind turbine generator with rotating blades/rotors attached at its outer end, a planetary gear system having a central sun gear and motor associated with the rotating disk and a main controller system connected to the vertical tower base, wherein the main control system controlling the startup input source from a state power supply system and a solar system supply operating the central motor.

1 Claim, 5 Drawing Sheets

18
16
C- power input central sun torque gear
19
21
D-power out put ring gear
22
E- Column loading the wind turbine Generators
11
F- 4 No. stationary planetary carrier
20

ROTATING SUPPORT FOR MULTIPLE WIND TURBINES

BACKGROUND OF THE INVENTION

1. Field of the Invention

The invention described to us is understood to relate generally to wind turbines. More specifically, the invention is a system for generating its own air currents to run electric turbines.

2. Description of the Related Art

Currently, Energy has become one of the most discussed topics of the 21st century. As technology continue to advance and individual dependence on gadgets increase, natural resources (such as oil, gas, and coal) continue to deplete this phenomenon (limited source of energy with increased demands for use) will result in an increased consumer cost and pollution over time. Green, sustainable energy has therefore become the hottest topic among visionaries as possible source for solutions to these issues. Accordingly, more and more individuals, organizations, and governments are investing their money into green, sustainable energy sources, such as wind farms.

Reliance on natural air currents, which requires waiting for a follow-up to the timing of these currents where it's not available all the time and everywhere, in addition to relying on a very high tower and searching for high places and very open areas to get air currents.

Thus, this invention solving the aforementioned problems is desired.

SUMMARY OF THE INVENTION

The invention described to us is understood to relate generally to wind turbines. More specifically, the invention is a system for generating its own air currents to run electric turbines. The system includes: a vertical tower or support provided with a rotating disk at its upper end; up to four laterally extending arms connected to the disk, each arm carrying a wind turbine generator with rotating blades/rotors attached at its outer end, a planetary gear system having a central sun gear and motor associated with the rotating disk, solar system supply, state supply system and a battery unit with a government supply power to the central motor for startup only.

The system for generating its own air currents to run electric turbines will works by state energy sources supply system or solar system and battery system, while, the solar and battery systems will supply energy rather the state supply during the day, and at sunset the system will change over to state power supply just to operate the central motor. The system for generating its own air currents to nm electric turbines reducing the fuel consumption in the main state electric power stations by supplying the central motor with state power to produce a double or more than double power.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
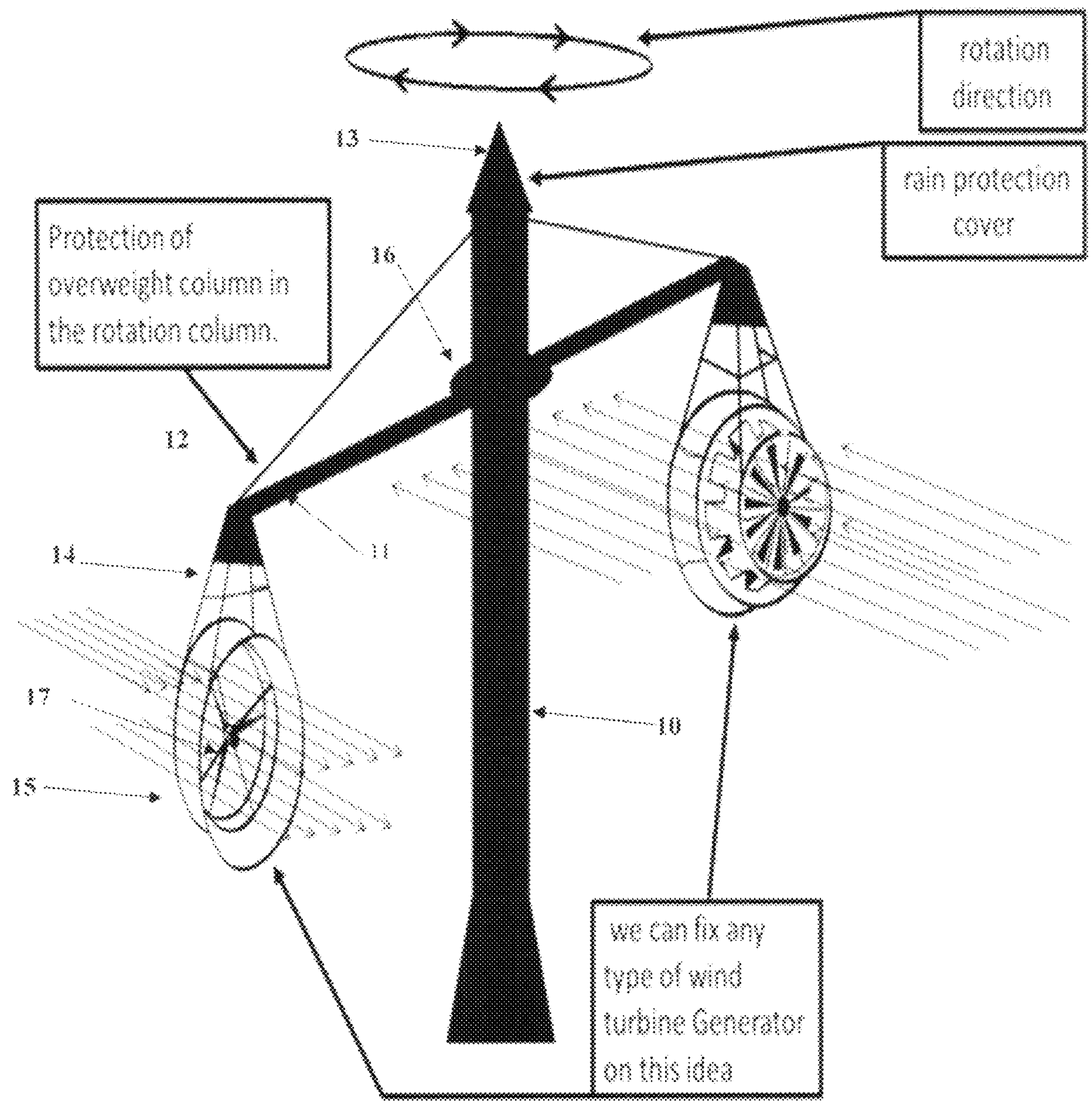
FIG. 1 is an embodiment of a continuous wind power system according to the present invention.
Figure 2:
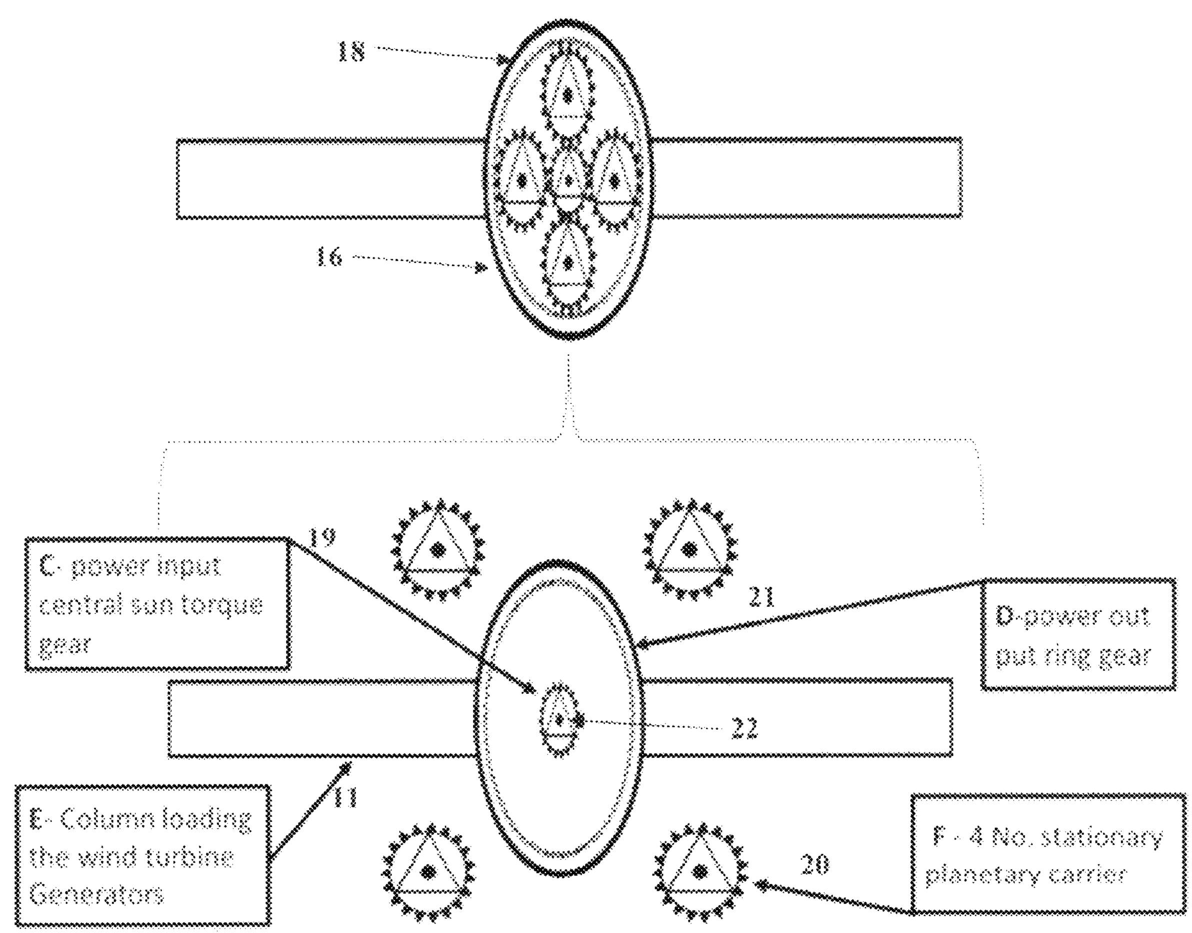
FIG. 2 is an embodiment of a planetary gear system according to the present invention.
Figure 3:
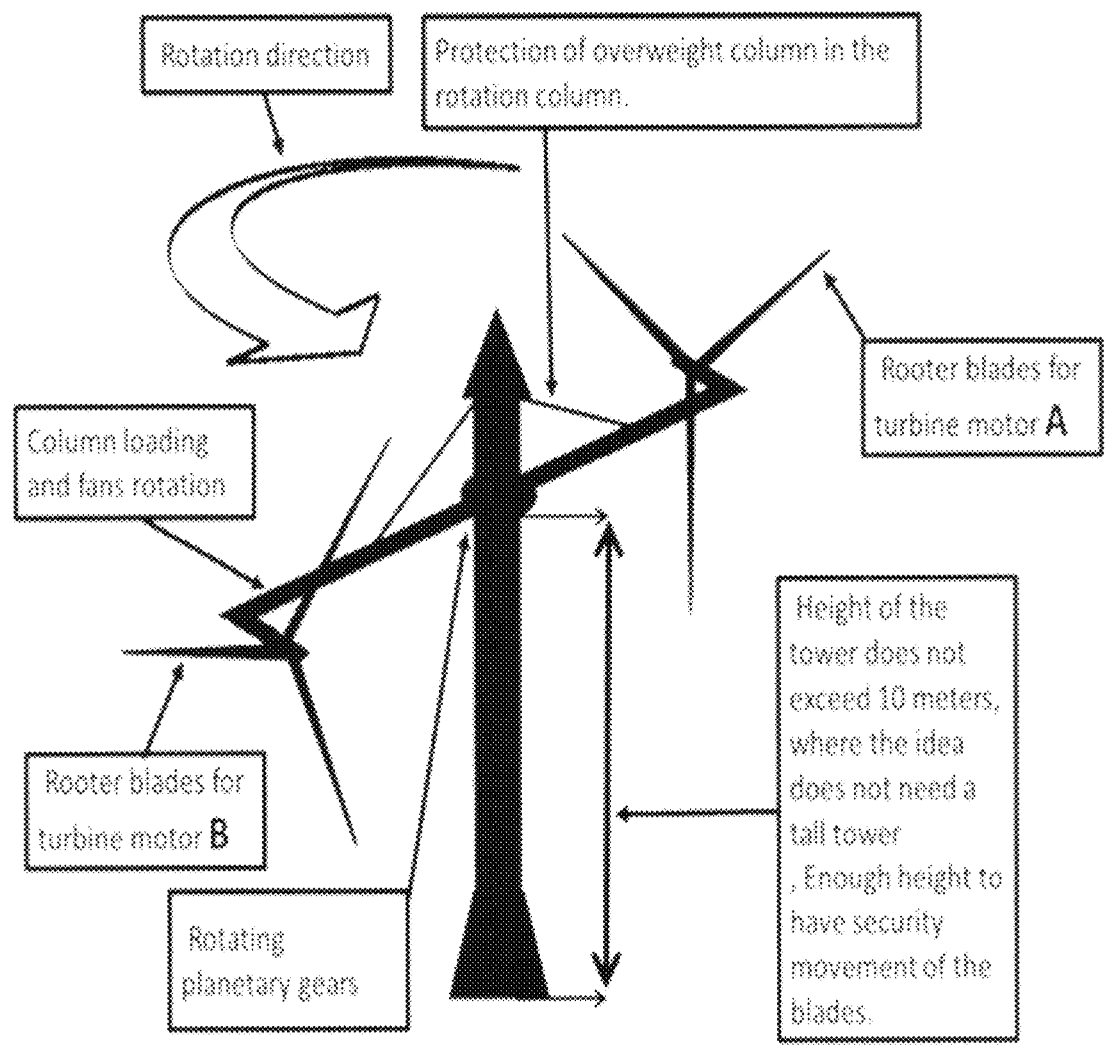
FIG. 3 illustrates an embodiment of a continuous wind power system operation and its specification according to the present invention.
Figure 4:
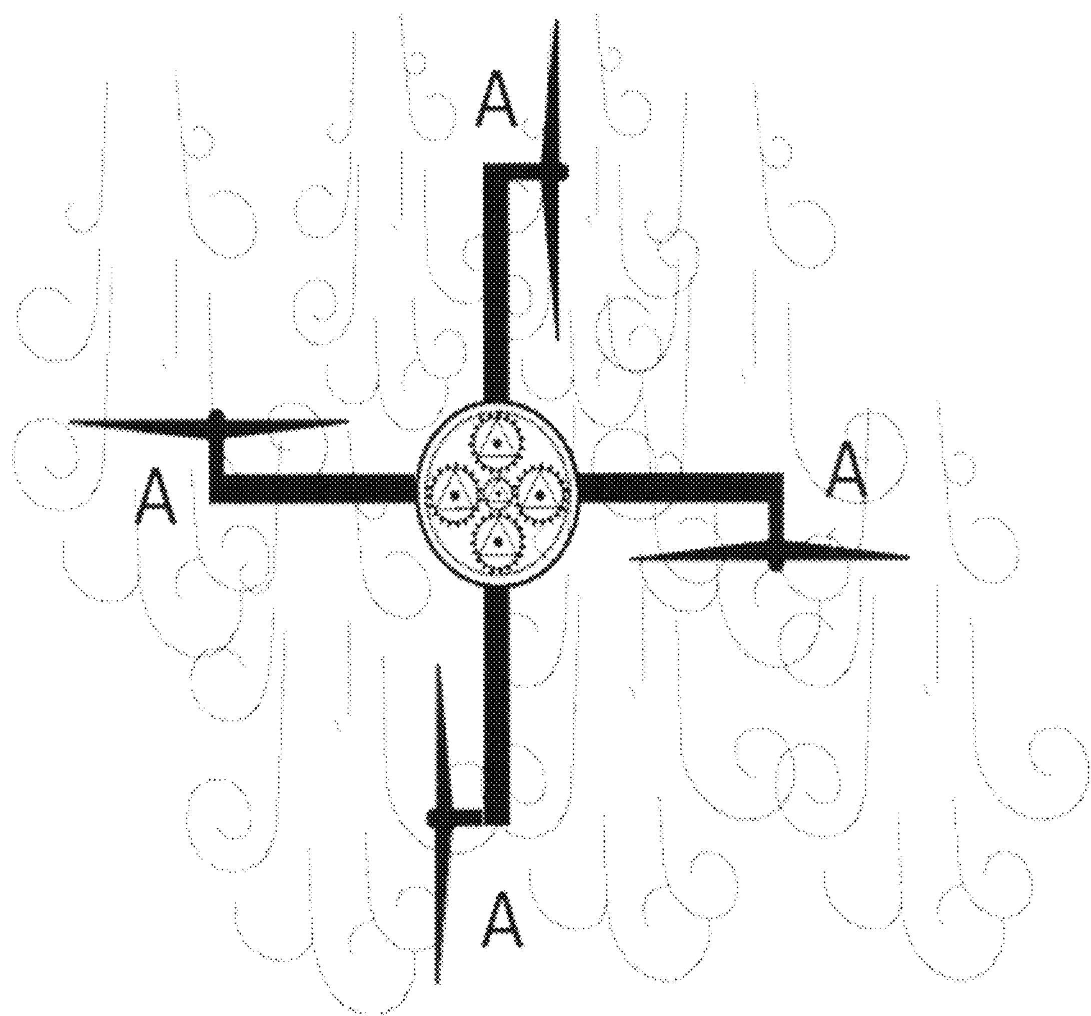
FIG. 4 illustrates another embodiment of the continuous wind power system according to the present invention.
Figure 5:
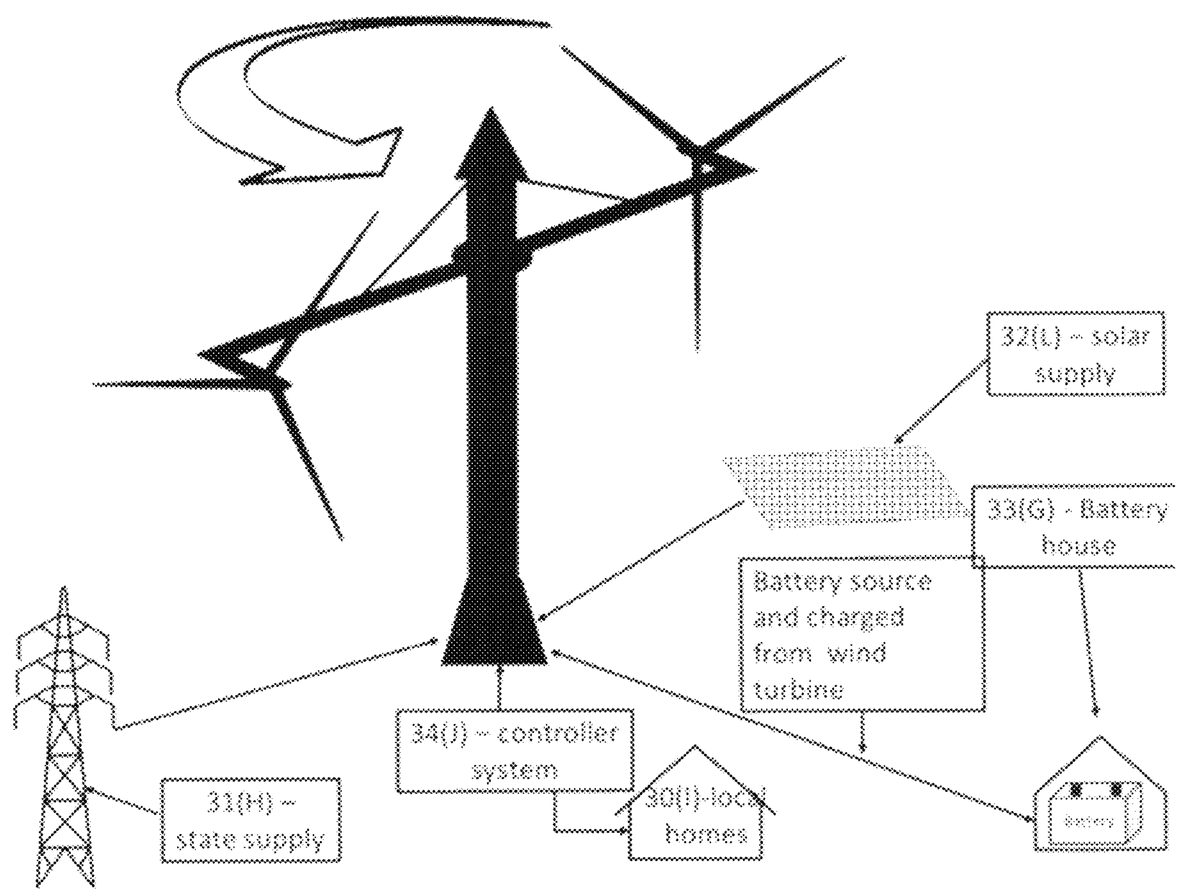
FIG. 5 illustrates battery and alternatives supply system according to the present invention.

Referring to Fig. all figures represent a system for generating its own air currents to run electric turbines for reducing the fuel consumption in the main state electric power stations by supplying the central motor with state power to produce a double or more than double power.

First embodiment of the invention illustrates the system 100 includes a vertical tower or support 10 provided with a rotating disk 16 at its upper end, two laterally extending arms 11 connected to the disk 16, with a holder 14, each arm carrying a wind turbine generator 15 with rotating blades/rotors 17 attached at its outer end, a planetary gear system 18 having a central sun gear 19 and central motor 22 associated with the rotating disk 16, a state power supply system 31 (H), a solar system supply 32(L), to operate the central motor 22, a especial batteries unit supply 33(G) to be use in the station site only, all these power supply system's go's to a main controller system 34 (J) to control which source should be use for the central motor.

A planetary gear system 18 having a central sun gear 19 and central motor 22 associated with the rotating disk 16, four of stationary planetary carriers gears 20 with their motors. Each of the planetary carrier's gears meshes with the ring gear 21 and the sun gear 19.

Notably, at the beginning of operating, the main controller system 34 (J) controls which source from the state power supply system 31 (H) or the solar system supply 32(L) is used to operate the central motor 22. After central motor operates, the wind turbine rotates and gets a power source from the wind turbines then transfer the AC power to the controller system 34 (J) to transfer it to the local homes 30(I), such as the state supply 31 will be use only at sunset or the lack of sufficient rays and it will be used only for the central motor.

The especial batteries unit supply 33(G) are charged from the three sources, wind turbine system, solar system 32 or the state power 31.

For example, when supplying the system with (0.5 megawatts) (MG) from the state power source 31 to operate the central motor 22, then the central motor will rotate the cross Column which it is holding the two or four wind turbines as shown in FIG. (4), then the output is 4 MG watts, if the system has four wind turbines, each wind turbine generates one MG watts then the output is free 3.5 MG watts because 0.5 MG loses in the central motor 22. So, the system saves a lot of energy and fuel costs in electric power stations of the state, where they are using a lot of oil & gas fuel to run the electric generating turbines.

There is a cover 13 to protect the tower 10 and rotating disk 15 from rain.

Here we do not need to build high tower, for example the blades length are around six meters depending on design needed, the tower will be ten meters' height also on design needed, just to holds the two or four number of wind turbines in safe condition.

It is to be understood that the present invention is not limited to the embodiments described above, but encompasses any and all embodiments within the scope of the following claims.

I claim:

1. A system for generating its own air currents to run electric turbines, the system comprising:

a vertical wind turbine tower, the tower having a base end supported on the ground and a distal end;

a rotating disk mounted on the tower and located adjacent the tower distal end, the rotating disk configured to rotate about the vertical axis of the vertical wind turbine tower;

four laterally extending arms, each of the arms having a proximal end connected to the rotating disk and a distal end, wherein each of the arms are equally spaced about the rotating disk and attached thereto by a planetary gear system, the planetary gear system including a central sun gear and central motor associated with the rotating disk; and a wind turbine generator with rotating blades attached to each of the laterally extending arms at its respective distal end whereby the rotating blades face in four distinct directions, wherein each of the rotating blades is in a vertical plane parallel to a vertical plane through its respective laterally extending arm.

* * * * *